Patented Oct. 28, 1947

2,429,876

UNITED STATES PATENT OFFICE 2,429,876

CATALYTIC HYDROGENATION OF AMINO-ACETONITRILE TO ETHYLENE DIAMINE

William F. Gresham, Wilmington, Del., assignor to E. I. du Pont de Nemours & Company, Wilmington, Del., a corporation of Delaware No Drawing. Application June 10, 1944, Serial No. 539,789

2 Claims. (Cl. 260—583)

This invention relates to a process for the preparation of ethylene diamine and more particularly to its preparation by the catalytic hydrogenation of aminoacetonitrile.

A number of processes have been proposed for the preparation of ethylene diamine but they all have been laboratory processes of only academic interest. It has been prepared by heating ethylene halides with alcoholic ammonia; by the reduction of ethylene dinitrile with metallic sodium in alcoholic solution; by converting esters of dibasic acids of the oxalic acid series to the hydrazide, thereafter converting the hydrazide to the azid and thru the dicarbamate to the amine. (J. Pr., 91 (11) 1 (1915)); and by the catalytic hydrogenation of aliphatic nitriles using palladium or nickel catalyst (Ber. 56, 1988). None of these methods of the art, however, produce ethylene diamine by a practical commercial process.

An object of the present invention is to provide an improved process for the preparation of ethylene diamine by the hydrogenation of aminoacetonitrile. Another object of the invention is to provide a process whereby aminoacetonitrile is hydrogenated to ethylene diamine in accord with a process wherein the formation of undesirable by-products is limited. Yet another object is to provide a process for the rapid conversion of aminoacetonitrile with little or no decomposition to ethylene diamine. A further object is to provide critical conditions for the reaction. Other objects and advantages of the invention will hereinafter appear.

Various hydrogenation processes have been disclosed wherein nitriles have been hydrogenated to corresponding amino compounds but these processes involve the hydrogenation of nitriles which are more or less stable and which do not easily decompose under the conditions of hydrogenation. The alpha amino nitriles, however, are under normal conditions especially unstable. They decompose, for example, upon standing at room temperature and often decompose with explosive violence when heated. It follows, therefore, that any reaction involving the alpha amino nitriles requiring sustained heating would result in decomposition. Moreover, of the alpha amino nitriles, aminoacetonitrile decomposes even during its purification from the crude reaction mixture in which it is formed (such, for example, as the mixture from the amination of formaldehyde cyanhydrin). While processes, therefore, have been disclosed for the preparation of ethylene diamine, none of them discloses its preparation by the hydrogenation of the very unstable aminoacetonitrile by any process.

A number of attempts were made by applicant to hydrogenate aminoacetonitrile to give commercially acceptable yields of ethylene diamine. These involved well established hydrogenation techniques by which, for example, aminoacetonitrile was charged to a suitable autoclave with a diluent and an active hydrogenation catalyst, hydrogen introduced and at temperatures and pressures normally used for hydrogenation an effort was made to convert the aminoacetonitrile to ethylene diamine. These efforts, however, were unsuccessful for, in lieu of obtaining ethylene diamine, viscous tarry products resulted. This early work by applicant appeared convincingly to prove that no practical process could be developed by this method. Many variations were tried which with other nitrile hydrogenations had been successful, such as dilution, temperature and pressure conditions of the reaction and the types of catalysts used. As a result of this work the conclusion appeared to be inescapable that ethylene diamine could not be commercially prepared from aminoacetonitrile by hydrogenation because of its instability and its tendency to decompose to tarry substances.

In spite of these negative results, the surprising discovery was made that aminoacetonitrile could be converted to ethylene diamine in substantially quantitative yields, providing sufficient catalyst was present rapidly to convert the nitrile to the amine. By operating in this manner, it was found that the hydrogenation of the aminoacetonitrile to ethylene diamine occurs with such rapidity that the highly unstable aminoacetonitrile is not held at hydrogenation temperatures long enough to decompose and as a consequence substantially all of it is converted directly to ethylene diamine.

In carrying into effect these findings, the process of the present invention is, for example, carried out by charging a pressure-resisting autoclave with a dilute solution of aminoacetonitrile, adding more than the normal amount of catalyst and conducting the reaction at suitable temperature and pressure in the presence of hydrogen.

The dilution of the aminoacetonitrile may be provided by the use of ammonia, an alcohol such as methanol, ethanol, n- or isopropanol, n- or isobutanol or a higher straight or branched chain aliphatic alcohol or by any other suitable diluent which is not hydrogenated during the reaction, which does not react to decompose the aminoacetonitrile or the ethylene diamine produced and which is a solvent for the aminoacetonitrile and preferably for the ethylene diamine also. The diluent should be present preferably in large excess, for example, from 15 to 60 moles of ammonia or alcohol per mole of aminoacetonitrile and preferably between 20 and 30 moles of the diluent per mole of the aminoacetonitrile.

Alternatively the hydrogenation may be carried out in the presence of an excess, in the order of from 4 to 16 moles, of an organic aliphatic acid ester per mole of the aminoacetonitrile such, for example, as the methyl, ethyl, propyl, butyl, and higher alkyl esters of formic, acetic, propionic, hydroxyacetic or the higher esters of the aliphatic mono- or polycarboxylic acids. Such a reaction will produce a diacyl substituted ethylene diamine which may, if desired, be hydrolyzed to ethylene diamine.

In addition to using a dilute solution another necessary limitation to conducting the reaction in order to obtain practical yields is that there should be present more catalyst than is normally employed in nitrile hydrogenation. Ordinarily in conducting catalytic hydrogenation reactions, catalysts are used to the extent of about ½ up to a maximum of about 10% based on the weight of the compound to be hydrogenated. It has been found, however, in the hydrogenation of aminoacetonitrile to ethylene diamine, that there should be present a considerable excess of catalyst over this amount, and this is true even with highly active catalyst such as the cobalt catalysts, the aluminum nickel alloy catalysts and the other catalyst described below. It has been found that generally the catalyst should be present in amounts ranging from 25% to in the order of 250% or more, based on the weight of aminoacetonitrile present. Considered from the volume relationship standpoint, the catalyst volume for those catalysts having about an equivalent activity per unit weight as the aforesaid cobalt and aluminum nickel alloy catalysts should preferably be at least as great as the solution volume. As has been indicated, the aminoacetonitrile decomposes under hydrogenation conditions and it is believed that the outstanding improvements in yields afforded by the process herein described is largely dependent on the rapid conversion of the aminoacetonitrile to the ethylene diamine. The use of these amounts of catalyst speeds up the reaction to such an extent that substantially no decomposition occurs, if there be sufficient diluent. It is equally important, however, that no decomposition of the nitrile shall occur before it reaches the catalyst. As a consequence, the time required for preheating to reaction temperature must not be excessive.

It has been determined that the aminoacetonitrile should not be held at reaction temperature for more than about seven minutes for beyond such a space of time decomposition products are formed with increasing rapidity. Ethylene diamine is relatively stable at hydrogenation temperatures and consequently it is essential to the successful operation of the process that the aminoacetonitrile be converted to the ethylene diamine as rapidly as possible. As the decomposition decreases with temperature a longer time can be allowed at the lower temperatures. At such temperatures, however, more active catalysts are usually required.

The effect of time on the decomposition is illustrated by a reaction in which aminoacetonitrile and hydrogen are passed into a tubular reaction zone containing the catalyst. In such a system the space of time within which the catalyst should act to give optimum results can be accurately measured for any given set of conditions and any given catalyst by increasing or decreasing the flow through the reaction zone. It has been found for a number of catalysts at preferred temperatures between 85° and 130° C. that a decrease in yield occurs if the aminoacetonitrile is held at temperature for three to seven minutes depending on the catalyst. Accordingly, the time at temperature should be less than seven minutes and preferably less than three minutes in order to obtain optimum yields, i. e., yields of 85% or better.

The hydrogenation is conducted at pressures above 100 atmospheres and preferably between 200 and 1000 atmospheres to insure rapid hydrogenation of the aminoacetonitrile to the relatively stable ethylene diamine. For liquid-phase operation autogenous pressures of in the order of 30 to 400 atmospheres may be used. The temperature of the hydrogenation should be between 25 and 300° C. and preferably between 85 and 130° C.

The reaction may be carried out in the presence of any suitable hydrogenation catalyst and preferably catalysts free from alkali metal and alkaline earth metal oxides, carbonates and hydroxides. A number of catalysts are recommended such, for example, as nickel alloy catalysts, copper chromite and nickel or cobalt catalysts supported on kieselguhr, silica gel, or similar inert support. It has been found that the above designated catalysts under proper conditions give fair yields of ethylene diamine, but the cobalt catalysts prepared in accord with the processes hereinafter described are highly active for the reaction and result in excellent conversion with desirable inhibition of by-products.

The examples which follow illustrate preferred embodiments of the invention in which parts are by weight unless otherwise indicated.

*Example 1.*—9.2 parts of aminoacetonitrile, 20.2 parts of a substantially pure cobalt catalyst prepared by the reduction of cobalt oxide up to 14 mesh granules with hydrogen at a temperature between 250 and 450° C., and 102 parts of ammonia were charged into a silver-lined shaker tube. Hydrogen was introduced to give a total pressure of approximately 700 atmospheres and the charge raised to reaction temperature between approximately 115 and 130° C. (at which temperature the reaction is complete in from about 0.5 to 1.2 minutes). The reaction mixture was filtered free from the catalyst, the filtrate fractionally distilled and a 79% yield of ethylene diamine based on aminoacetonitrile was obtained.

*Example 2.*—The process described in Example 1 was repeated employing 22.4 parts of aminoacetonitrile, 272 parts of ammonia and 40 parts of a nickel-aluminum alloy catalyst of the Raney nickel type. Other conditions were the same except that the hydrogenation was conducted at a temperature of 100° C. Approximately a 77% yield of ethylene diamine was obtained.

*Example 3.*—The process of Example 1 was repeated employing 7 parts of aminoacetonitrile, 85 parts of ammonia, 20 parts of the catalyst of Example 1. The reaction was conducted at a temperature of 100 to 125° C. All other conditions were approximately the same as those described in Example 1. The yield of ethylene diamine based on aminoacetonitrile was approximately 81.2%.

The first three examples illustrate the use of greater than normal amounts of catalyst and diluent whereby excellent yields of the ethylene diamine are obtained. The poor results attending the use of normal amounts of catalyst with diluted aminoacetonitrile are illustrated by Example 4.

*Example 4.*—The process of Example 2 was repeated using 22.4 parts of aminoacetonitrile, 272 parts of ammonia and 2.2 parts of catalyst. All other conditions were the same. No ethylene diamine was recoverable and substantially all of the aminoacetonitrile charged was decomposed to tarry materials.

By conducting the process in only a slight excess of the diluent results are poor even with an excess of catalyst. Such a procedure is illustrated by Example 5. This example should be compared with the first 3 examples which describe the use in each instance of a large excess of a diluent.

*Example 5.*—The process of Example 1 was repeated employing 14 parts of aminoacetonitrile, 51 parts of ammonia and 20 parts of the catalyst of Example 1. The reactants were heated at 100° C. in an atmosphere of hydrogen and under a pressure of approximately 700 atmospheres. Substantially no ethylene diamine was formed.

The reaction may, if desired, be carried out by way of a continuous as distinguished from a batchwise process. By such a process, the aminoacetonitrile, together with the diluent or with an ester, are introduced continuously together with hydrogen into a reaction zone which may, for example, be a cylindrical converter in which the ratio of diameter to length is not greater than about 1:10. The converter is charged with the catalyst with substantially no free space at the inlet end so that substantially immediately after introduction of the reactants into the reaction zone the aminoacetonitrile comes in direct contact with a relatively large volume of the catalyst under the temperatures and pressures of hydrogenation.

The outstanding success of the process herein described is attributable in no small degree to the use of a greater than normal amount of catalyst. The principal function performed by the catalyst is to convert the aminoacetonitrile to ethylene diamine, substantially as rapidly as the aminoacetonitrile is brought to reaction temperature. It is well known that certain catalysts, due to the manner in which they are prepared, are considerably more active than catalysts prepared in another manner. The ratio, therefore, of activity to weight of catalyst varies considerably with any given catalyst, due inter alia to the manner in which it has been prepared and/or activated and the surface area exposed to the reactants. In accord with this invention, and the catalysts which have been investigated for the hydrogenation of aminoacetonitrile, it has been found that at least 25% by weight of the catalyst based on the aminoacetonitrile should be used. It is probable that other catalysts having much greater activity on a unit weight basis could be provided which would convert the aminoacetonitrile to ethylene diamine in a sufficiently short space of time to satisfy the requirements of this invention and give satisfactory conversions to the diamine using somewhat smaller amounts of catalysts, although to date no such catalyst has been found. The function of the catalyst, therefore, is to catalyze the hydrogenation in such a short space of time that substantially no aminoacetonitrile is decomposed, and in such a short space of time that substantially no reaction products have time to form between aminoacetonitrile and ethylene diamine. This function is one of the principal features of the invention.

I claim:

1. In a continuous process for the preparation of ethylene diamine, the steps which comprise passing a mixture of from 15 to 60 moles of ammonia per mole of aminoacetonitrile through a hydrogenation catalyst, conducting the hydrogenation at a temperature between 85 and 130° C. under a hydrogen pressure of from 200 to 1000 atmospheres, and maintaining the mixture at hydrogenation temperature for a contact time of not more than 7 minutes.

2. In a continuous process for the preparation of ethylene diamine, the steps which comprise passing a mixture of from 15 to 60 moles of ammonia per mole of aminoacetonitrile through a cobalt hydrogenation catalyst, conducting the hydrogenation at a temperature between 85 and 130° C. under a hydrogen pressure of from 200 to 1000 atmospheres, and maintaining the mixture at hydrogenation temperature for a contact time of less than three minutes.

WILLIAM F. GRESHAM.

REFERENCES CITED

The following references are of record in the file of this patent:

UNITED STATES PATENTS

| Number | Name | Date |
| --- | --- | --- |
| 2,232,598 | Farlow | Feb. 18, 1941 |
| 1,992,615 | Hoffmann | Feb. 26, 1935 |

OTHER REFERENCES

Beilstein, "Handbuch der Org. Chemie," vol. III—IV (4th ed., 2nd supplement), p. 676.